United States Patent [19]

Kobayashi et al.

[11] Patent Number: 4,727,835

[45] Date of Patent: Mar. 1, 1988

[54] FUEL INJECTION DEVICE IN DIESEL ENGINE

[75] Inventors: Fumiaki Kobayashi, Toyota; Mamoru Kobashi, Aichi; Mamoru Takata, Toyota; Masahiko Miyaki, Oobu; Takashi Hasegawa, Tazimi, all of Japan

[73] Assignees: Toyota Jidosha Kabushiki Kaisha; Nippondenso Co., Ltd., both of Aichi, Japan

[21] Appl. No.: 836,079

[22] Filed: Mar. 4, 1986

[30] Foreign Application Priority Data

Mar. 4, 1985 [JP] Japan .................................. 60-42143

[51] Int. Cl.$^4$ .......................................... F02M 39/00
[52] U.S. Cl. .............................. 123/198 DB; 123/479; 123/506; 123/458
[58] Field of Search ........ 123/506, 458, 479, 198 DB, 123/446

[56] References Cited

U.S. PATENT DOCUMENTS

| | | | |
|---|---|---|---|
| 4,429,670 | 2/1984 | Ulanet | 123/198 DB |
| 4,519,353 | 5/1985 | Ito | 123/198 DB |
| 4,520,780 | 6/1985 | Ito | 123/198 DB |
| 4,531,190 | 7/1985 | Drews | 123/479 |
| 4,589,401 | 5/1986 | Karim | 123/479 |
| 4,597,369 | 7/1986 | Yasuhara | 123/198 DB |
| 4,602,600 | 7/1986 | Akatsuka | 123/479 |

FOREIGN PATENT DOCUMENTS 0128428  8/1983  Japan .................................. 123/506

*Primary Examiner*—Carl Stuart Miller
*Attorney, Agent, or Firm*—Parkhurst & Oliff

[57] ABSTRACT

In controlling a fuel injection quantity by spilling a part of fuel fed from a high pressure chamber of a fuel injection pump using a high pressure electromagnetic valve which is on-off controlled by a driving circuit in accordance with engine operating conditions, switch means is provided between the high pressure electromagnetic valve and a power source, an output signal from the driving circuit is monitored, and the switch means is opened when the output signal from the driving circuit continues more than a predetermined period.

9 Claims, 6 Drawing Figures

FUEL INJECTION DEVICE IN DIESEL ENGINE

BACKGROUND OF THE INVENTION

1. Field of the Invention

This invention relates to a fuel injection device in a deisel engine, and more particularly to improvements in a fuel injection device in a diesel engine, suitable for use in a motor vehicle diesel engine provided with an electromagnetic spill type fuel injection pump, wherein a fuel injection quantity is controlled by a high pressure electromagnetic valve which is on-off controlled in accordance with engine operating conditions.

2. Description of the Prior Art

Because of developments in digital control techniques in recent years, a so-called electronically controlled diesel engine, wherein a fuel injection pump in a diesel engine is electronically controlled, has been commercialized.

There are various methods of electronically controlling the fuel injection pump, one of which is a method using an electromagnetic spill type fuel injection pump, wherein spill of fuel in the fuel injection pump is controlled by an electromagnetic valve. In this electromagnetic spill type fuel injection pump, upon the fuel injection quantity reaching a target valve, a spill port is released by a high pressure electromagnetic valve to control the fuel feed under the pressure, thus controlling the fuel injection quantity.

When a diesel engine, wherein the fuel injection quantity is controlled by a high pressure electromagnetic valve, uses a normally closed type electromagnetic valve as a high pressure electromagnetic valve, the disconnection of a solenoid in the electromagnetic valve or the blocking of a path in the electromagnetic valve by extraneous matters results in a full quantity injection condition of the fuel injection pump, thus disabling its control and causing an overrun of engine speed. Furthermore, when a normally open electromagnetic valve is used, trouble in a control circuit, a short-circuit between a wire harness of the electromagnetic valve and a battery or the continuous passing of current through the solenoid, causes the full quantity injection conditions, resulting in the inability control the fuel injection quantity and the occurence of an overrun of engine speed as well.

To obviate the above-described disadvantages, Japanese Patent Laid-Open No. 47630/1981 discloses that, when an abnormal increase in engine speed is detected, a fuel cut solenoid is closed, thereby stopping the fuel supply.

Furthermore, in Japanese Utility Model Application No. 13777/1984, the applicant discloses that, when a difference between a target engine speed and an actual engine speed exceeds a predetermined value, the fuel cut solenoid is closed in order to stop the fuel supply.

In all of these conventional cases, however, a fuel cut solenoid separate from the electromagnetic spill valve is provided, such that when an abnormality in the engine speed is detected, the fuel supply is cut by the fuel cut solenoid. Then electromagetic valve itself is not protected and a power source voltage is applied to the electromagnetic spill valve due to a trouble in the electromagnetic valve driving circuit, a wire harness or the like. When current continues to flow through the electromagnetic spill valve, the valve falters. Furthermore, when an abnormality is detected from the engine speed, it is detected indirectly, resulting in too slow on engine response.

Alternatively, U.S. Pat. No. 4,491,112 discloses a failsafe system for an engine control servomotor, wherein a servomotor command signal is compared with a feedback signal from the servomotor, and, when a difference therebetween is higher than a preset value for more than a preset time period, the servomotor is shut down. However, this invention does not attempt to protect the high pressure electromagnetic valve, as does the present invention.

SUMMARY OF THE INVENTION

The present invention has been developed to obviate the above-described disadvantages of the prior art and has as its object the provision of a fuel injection device in a diesel engine, capable of preventing secondary troubles such as coil short-circuit, valve blocking, burning and the like, which are caused by overheating due to continuous energizing of the high pressure electromagnetic valve.

To this end, the present invention contemplates a fuel injection device in a diesel engine, wherein a fuel injection quantity is controlled by spilling a part of fuel fed from a high pressure chamber of a fuel injection pump using a high pressure electromagnetic valve which is on-off controlled by a driving circuit in accordance with engine operating conditions, said device basically comprising, as shown in FIG. 1:

switch means provided between said high pressure electromagnetic valve and a power source; and trouble detecting means for monitoring an output signal from said driving circuit, and opening said switch means when said output signal from said driving circuit continues more than a predetermined period.

A specific embodiment of the present invention is of such an arrangement that said switch means is a relay of normally open type to allow for the adequate counteraction of troubles.

Another specific embodiment of the present invention is of such an arrangement that disconnection detecting means for detecting a disconnection of a wire between the high pressure electromagnetic valve and the driving circuit is further provided, so that troubles of a wider variety are counter measured.

A further specific embodiment of the present invention is of such an arrangement that the trouble detecting means stops the energizing of a fuel cut valve connected in parallel to the high pressure electromagnetic valve upon the detection of a trouble. The driving of the fuel cut valve, which had been independent, is then driven through the same switch means, thus simplifying the necessary circuitry, reducing costs and improving the reliability of the system.

A still further specific embodiment of the present invention is of such an arrangement that a means for closing the switch means withal the output signal of the driving circuit when a voltage of the power source is low and the engine is in a starting condition is further provided, thus preventing start failure due to a malfunction of the switch means during starting.

According to the present invention, in controlling a fuel injection quantity by spilling a part of fuel fed from a high pressure chamber of a fuel injection pump using a high pressure electromagnetic valve on-off controlled by a driving circuit in accordance with engine operating conditions, switch means is provided between the high pressure electromagnetic valve and a power source, an output signal of the driving circuit is monitored and the switch means is opened when the output signal from the driving circuit continues more than a predetermined period. As a consequence, continuous energizing of the high pressure electromagnetic valve due to trouble in the electromagnetic valve driving circuit, a short-circuit of the wire harness between the electromagnetic valve and an electronic control unit and the like can be avoided, and secondary troubles such as a short-circuit of the solenoid, a sticking of the electromagnetic valve itself, a blocked valve due to the flowout of resin, a burned valve and the like, all of which are caused by overheating due to the continuous energizing of the high pressure electromagnetic valve, can be avoided, thereby improving the reliability of the system.

BRIEF DESCRIPTION OF THE DRAWINGS

The exact nature of this invention, as well as other objects and advantages thereof, will be readily apparent from the consideration of the following specification relating to the accompanying drawings, wherein.

DESCRIPTION OF THE PREFERRED EMBODIMENT

Detailed description will hereunder be given of an embodiment of a fuel injection device suitable for use in an electronically controlled diesel engine for a motor vehicle, said device according to the present invention being described with reference to the drawings.

Figure 1:
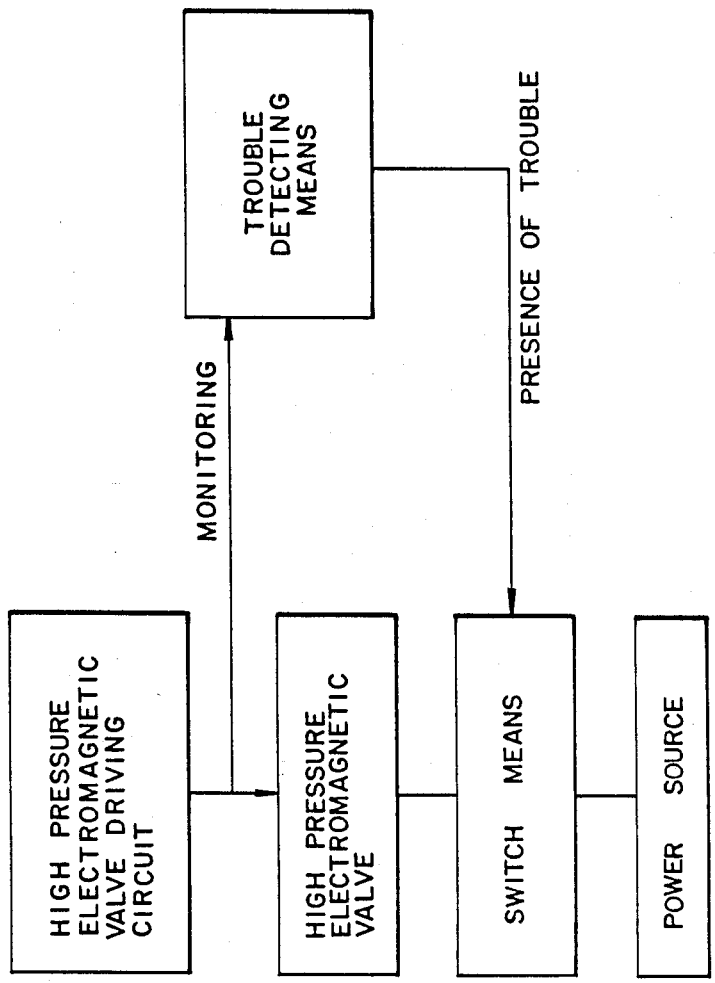
FIG. 1 is a block diagram showing the basic arrangement of a fuel injection device of the diesel engine according to the present invention.
Figure 2:
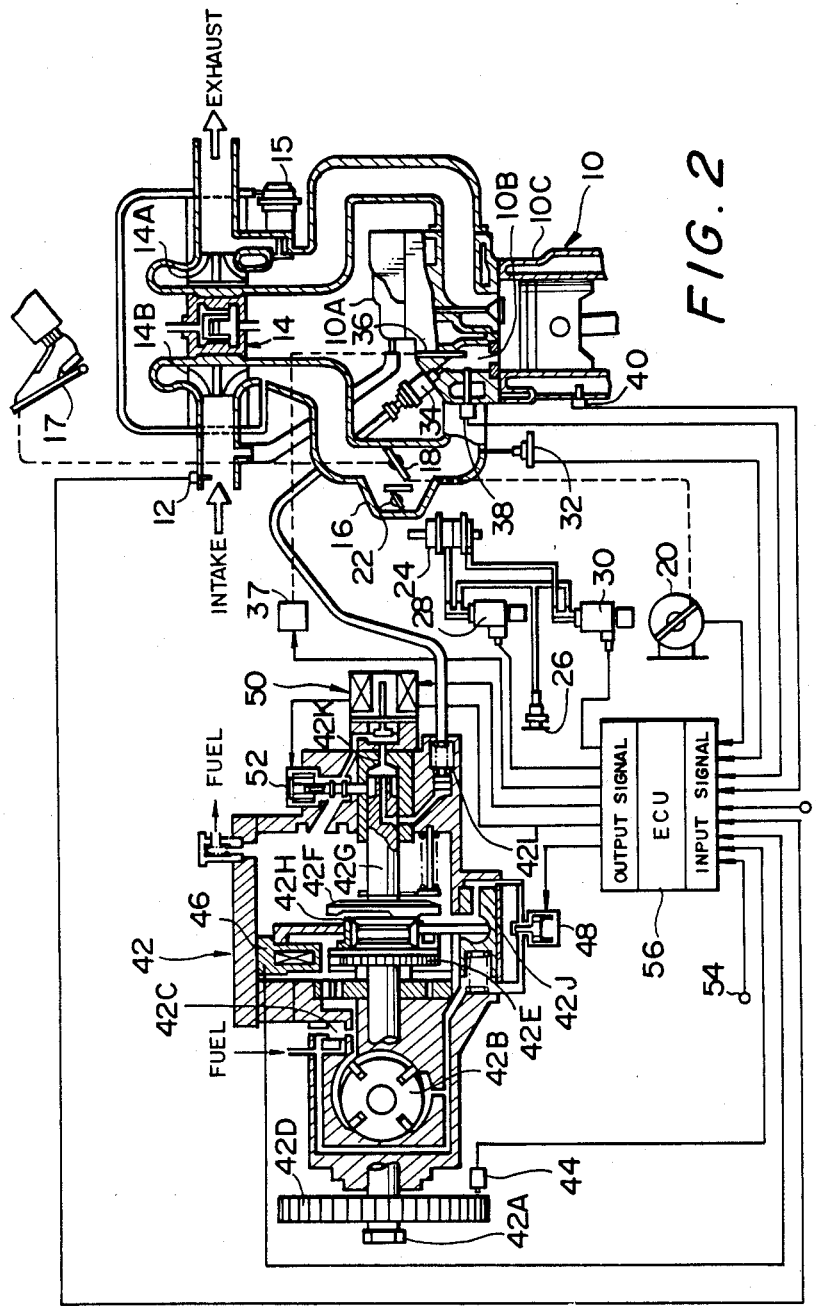
FIG. 2 is a sectional view, partially including a block diagram, showing the general arrangement of an electronically controlled diesel engine of a motor vehicle, to which is applied the present invention.

As shown in FIG. 2, in this embodiment, an intake-air temperature sensor 12 for detecting intake-air temperature is provided at the downstream side of an air cleaner, not shown. Provided at the downstream side of this intake-air temperature sensor 12 is a turbo charger 14 including a turbine 14A rotatable by heat energy of the exhaust gas and a compressor 14B rotatable in operational association with this turbine 14A. The upstream side of the turbine 14A of the turbocharger 14 and the downstream side of the compressor 14B communicate with each other through a waste gate valve 15 which prevents an intake-air pressure from being raised excessively high.

Provided in a venturi 16 disposed at the downstream side of the compressor 14B is a main intake-air throttle valve 18 rotatable non-linearly in operational association with an accelerator pedal 17, for restricting an intake-air flow rate during times of engine idling and the like. The opening angle Accp of the accelerator pedal 17 (hereinafter referred to as a "accelerator opening") is detected by an accelerator position sensor 20.

Provided in parallel to the main intake-air throttle valve 18 is an auxiliary intake-air throttle valve 22, the opening of which is controlled by a diaphragm device 24. Supplied to the diaphragm device 24 is vacuum generated by a vacuum pump 26 through a vacuum switching valve 28 or 30 (hereinafter referred to as a "VSV").

Provided at the downstream side of the intake-air throttle valves 18 and 22 is an intake pressure sensor 32 for detecting intake-air pressure.

A cylinder head 10A of a diesel engine 10 is provided with an injection nozzle 34, a glow plug 36 and an ignition timing sensor 38, the forward ends of which are located in an engine combustion chamber 10B. Furthermore, provided on a cylinder block 10C of the diesel engine 10 is a water temperature sensor 40 for detecting the temperature of engine cooling water.

Glow current is supplied to the glow plug 36 through a glow relay 37.

Fuel is fed under pressure to the injection nozzle 34 from an electromagnetic spill type injection pump 42. The injection pump 42 includes: a driving shaft 42A rotatable in operational association with the rotation of a crankshaft of the diesel engine 10; a feed pump 42B (FIG. 2 shows a state wherein the pump is developed through 90°) solidly secured to the driving shaft 42A, for giving pressure to the fuel; a fuel pressure regulating valve 42C for regulating fuel feed pressure; a reference position sensor 44, for example an electromagnetic pickup, for detecting a reference position such as top dead center (TDC) from a displacement in rotation of a gear 42D solidly secured to the driving shaft 42A; an engine speed sensor 46, for example an electromagnetic pickup, for detecting an engine speed from a displacement in rotation of a gear 42E solidly secured to the driving shaft 42A; a roller ring 42H for reciprocating a face cam 42F and a plunger 42G and varying the timing thereof; a timer piston 42J (FIG. 2 shows a state wherein the timer piston is developed through 90°) for varying a rotary position of the roller ring 42H; a timing control valve 48 (hereinafter referred to as a "TCV") for controlling the position of the timer piston 42J to control the injection timing; an electromagnetic spill valve 50 for varying fuel relief timing from the plunger 42G through a spill port 42K to control the fuel injection quantity; a fuel cut solenoid 52 for cutting the fuel during the presence of an abnormal condition; and a delivery valve 42L for preventing back flow and after-dripping of the fuel.

Outputs from the intake-air temperature sensor 12, the accelerator position sensor 20, the intake pressure sensor 32, the ignition timing sensor 38, the water temperature sensor 40, the reference position sensor 44, the engine speed sensor 46, a glow current sensor 54 for detecting the glow current flowing through the glow plug 36, an air conditioner switch, a neutral safety switch and a vehicle speed signal are inputted to and processed in an electronic control unit 56 (hereinafter referred to as an "ECU"). The VSV 28, 30, the glow relay 37, the TCV 48, the electromagnetic spill valve 50 and the fuel cut solenoid 52 are controlled by outputs from the ECU 56.

Figure 3:
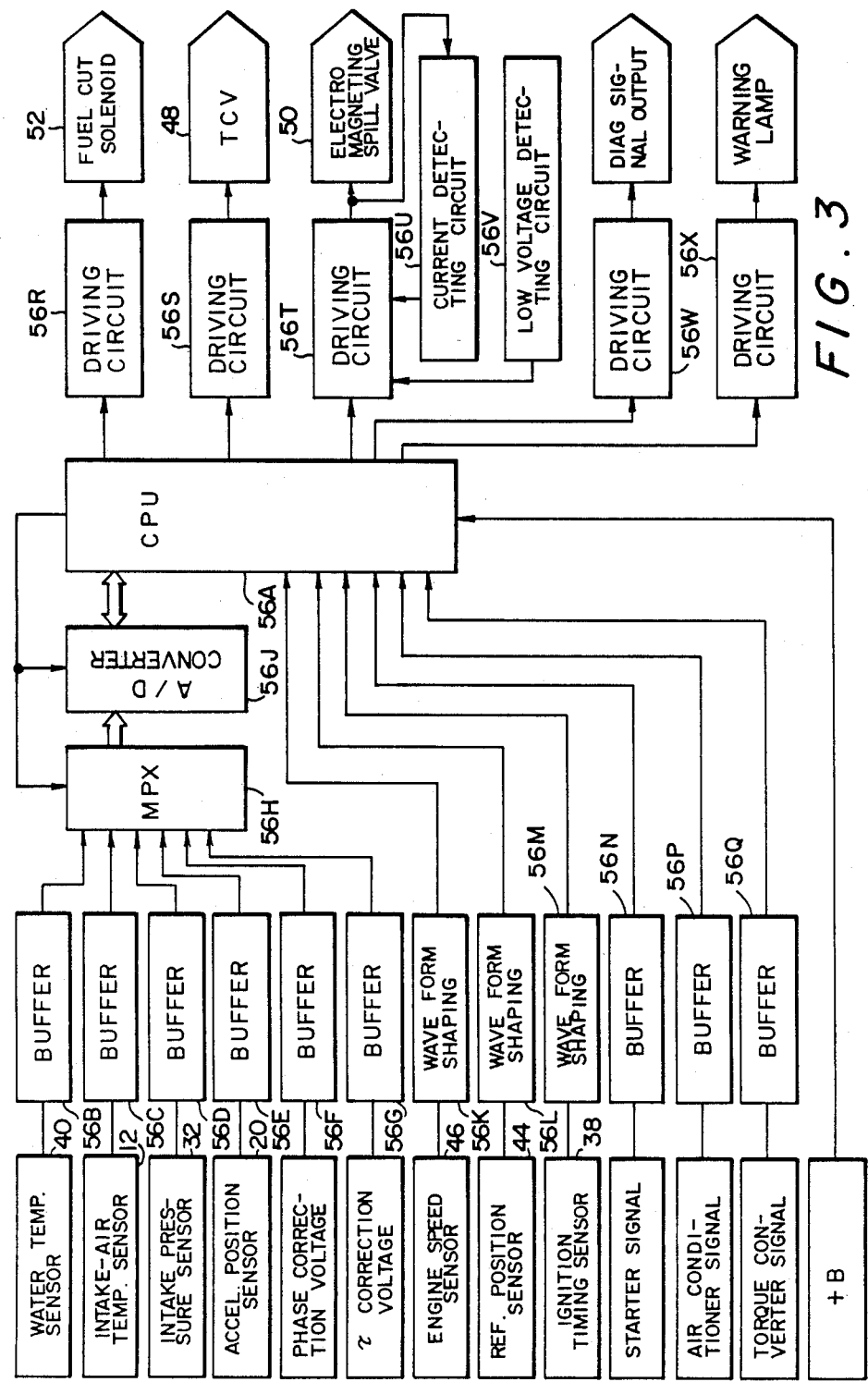
FIG. 3 is a block diagram showing the arrangement of the electronic control unit used in the above embodiment.

As shown in detail in FIG. 3, the ECU 56 includes: a central processing unit 56A (hereinafter referred to as a "CPU") for performing various calculation processing;

a multiplexer 56H (hereinafter referred to as a "MPX") for succesively taking in an output from the water temperature sensor 40, which is inputted through a buffer 56B, an output from the intake air temperature sensor 12, which is inputtted through a buffer 56C, an output from the intake pressure sensor 32, which is inputted through a buffer 56D, an output from the accelerator position sensor 20, which is inputted through a buffer 56E, a phase correction voltage signal, which is inputted through a buffer 56F and a tau correction voltage signal, which is inputted through a buffer 56G, an analog-digital converter 56J (hereinafter referred to as an "A/D converter") for converting analog signals outputted from the MPX 56H into digital signals and inputting the same into the CPU 56A; a wave form shaping circuit 56K for wave form shaping an output from the engine speed sensor 46 and inputting the same into the CPU 56A; a wave form shaping circuit 56L for wave form shaping an output from the reference position sensor 44 and inputting the same into the CPU 56A; a wave form shaping circuit 56M for wave form shaping an output from the ignition timing sensor 38 and inputting the same into the CPU 56A; a buffer 56N for inputting a starter signal into the CPU 56A; a buffer 56P for inputting an air conditioner signal into the CPU 56A; a buffer 56Q for inputtting a torque converter signal into the CPU 56A; a driving circuit 56R for driving the fuel cut solenoid 52 in accordance with the results of calculations made by the CPU 56A; a driving circuit 56S for driving the TCV 48 in accordance with the results of calculations made by the CPU 56A; a driving circuit 56T for driving the electromagnetic spill valve 50 in accordance with the results of calculations made by the CPU 56A; a current detecting circuit 56U for detecting a current flowing through the electromagnetic spill valve 50 and feeding-back the same to the driving circuit 56T; a low voltage detecting circuit 56V for detecting a low voltage and inputting the same into the driving circuit 56T; a driving circuit 56W for outputting a self diagnosis signal (hereinafter referred to as a "diag signal") in accordance with the results of calculations made by the CPU 56A; and a driving circuit 56X for driving a warning lamp in accordance with the results of calculations made by the CPU 56A.

The aforesaid phase correction voltage signal is a signal for correcting a phase difference between a normal position and an actual mounted position when the reference position sensor 44 is mounted to the injection pump 42. The aforesaid tau correction voltage signal is a signal for correcting a deviation in responsiveness due to a difference between individual parts of the injection pump 42.

Figure 4:
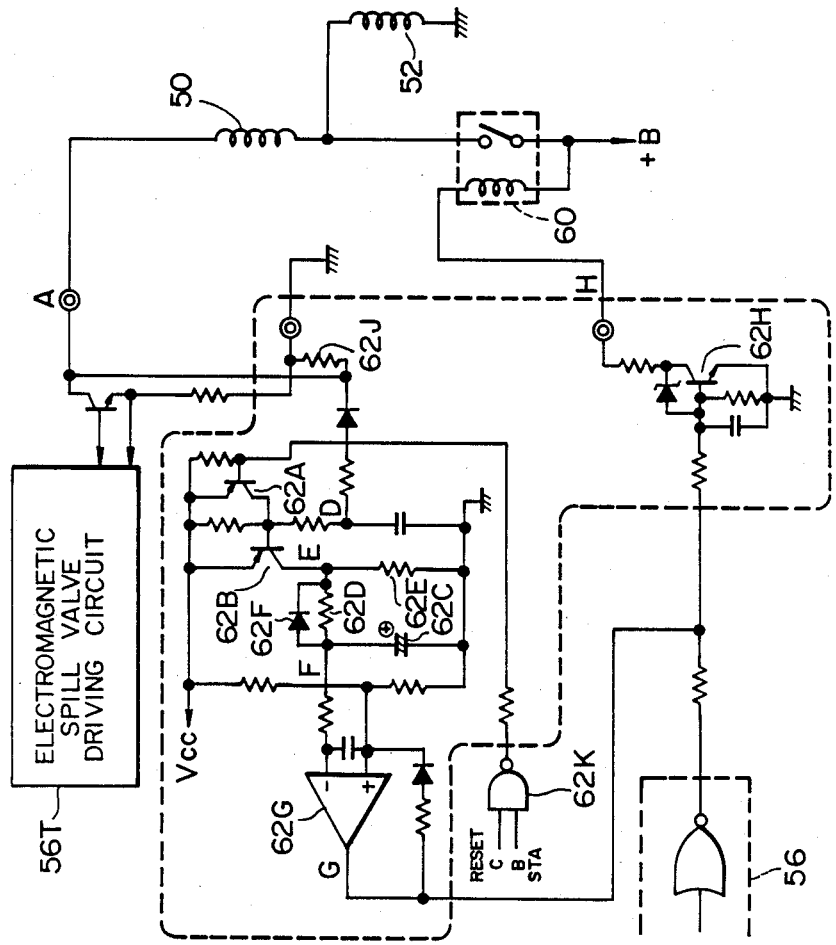
FIG. 4 is a circuit diagram showing the arrangement of the trouble detecting circuit used in the above embodiment.

As shown in detail in FIG. 4, a failsafe circuit according to the present invention includes: a failsafe relay 60 of a normally open type connected in series to the upstream side of the electromagnetic spill valve 50, which is disposed on the output side of the driving circuit 56T; and a trouble detecting circuit 62 for monitoring an output of the driving circuit 56T and detecting the presence of the continuous energizing and disconnection of a wire harness between the electromagnetic spill valve 50 and the driving circuit 56T, actuating the failsafe relay 60 and causing the energizing of the electromagnetic spill valve 50 and the fuel cut solenoid 52, which are connected in parallel, to stop.

As shown in FIG. 4, the trouble detecting ciruucit 62 is mainly comprised of: transistors 62A and 62B; a capacitor 62C and a resistor 62D, which are set at sufficiently high time constants; a resistor 62E of relatively low resistance for discharge; a diode 62F; a comparator 62G; and a transistor 62H for driving the failsafe relay 60 in accordance with an output from the comparator 62G and an output from the driving circuit 56R of the fuel cut solenoid 52.

As a consequence, when the pressure of a terminal A driving the electromagnetic spill valve 50 is low, that is, the electromagnetic spill valve 50 is energized, the transistor 62A is turned off and the transistor 62B is turned on, causing the capacitor 62C to be charged through the resistor 62D of relatively high resistance. The time constants of the capacitor 62C and the resistor 62D are set at sufficiently high values, whereby, when the duty ratio of the electromagnetic spill valve 50 becomes the timing driver of the circuit, pressure is not raised to a threshold level at which the value of an output G from the comparator 62G is brought to its low level. On the other hand, when the pressure at the terminal A reaches a level high enough to deenergize the electromagnetic spill valve 50, the transistor 62A is turned on and the transistor 62B is turned off, causing the electric charge of the capacitor 62C to be rapidly discharged through the diode 62F and the resistor 62E of relatively low resistance.

Figure 5:
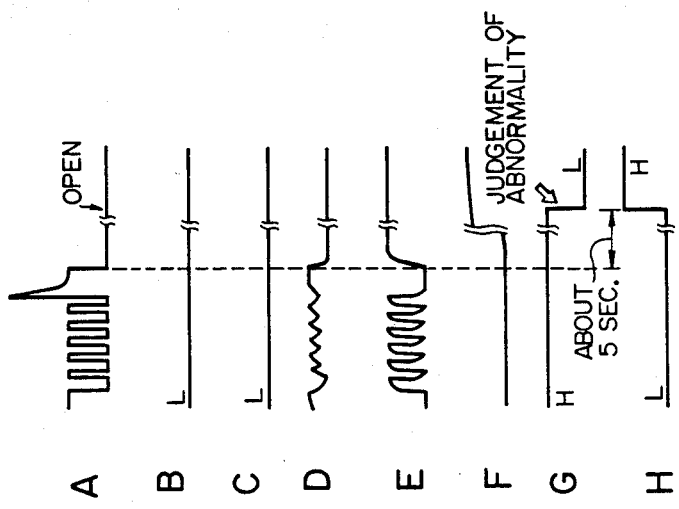
FIG. 5 is a chart showing examples of working wave forms in respective sections during normal and abnormal times in the above embodiment.

As a consequence, as shown in FIG. 5, an output from the comparator 62G continues to be on the high level under normal conditions to turn on the transistor 62H, whereby the failsafe relay 60 is energized. On the other hand, when trouble occurs, for example, in the electromagnetic spill valve driving circuit 56T, whereby the electromagnetic spill valve 50 is continously energized, or the wire harness between the electromagnetic spill valve 50 and the ECU 56 is short-circuited to ground, causing the electromagnetic spill valve 50 to be continuously energized as well, an electric potential at the point A continues to be low, whereby the transistor 62B continues to be on, causing the capacitor 62C to be charged and the electric potential at a point F to become high. The electric potential at a point G then becomes low, so that the failsafe relay 60 is turned off. When the resistor 62J is added, a disconnection of the wire harness between the electromagnetic spill valve 50 and the ECU 56 can be detected. Specifically, the electric charge is discharged through the resistor 62J at the time of the disconnection, causing the potential at the output of the comparator 62G to become low.

Figure 6:
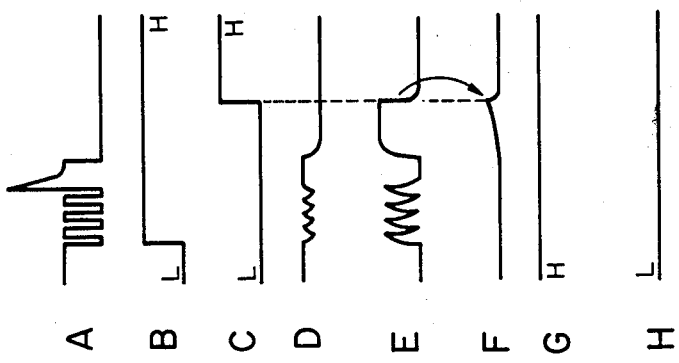
FIG. 6 is a chart showing examples of working wave forms in respective sections during the starting time and the time of the the electronic control unit being reset.

When the CPU 56A is reset due to a pressure drop during starting, the electromagnetic spill valve 50 becomes continuously energized to improve the startability, whereby an output from a NAND gate 62K forcedly turns on the transistor 62A and turns off the transistor 62B, so that the trouble detecting ciruucit 62 according to the present invention is not actuated. Examples of the working wave forms of the respective sections in this embodiment are shown in FIG. 6.

In this embodiment, the resistor 62J is added to the trouble detecting ciruucit 62 to detect a disconnection of the wire harness between the electromagnetic spill valve 50 and the driving circuit 56T thereof, so that the range of detectable troubles is wide. Additionally, the resistor 56J can be dispensed with.

Furthermore, in this embodiment, the fuel cut solenoid 52 is connected in parallel to the electromagnetic spill valve 50, so that the circuitry can be simplified, the costs can be reduced and the reliability of the system can be improved.

Further, in this embodiment, the failsafe relay 60 is of the normally open type, so that the measures to counter the troubles are perfect.

What is claimed is:

1. A fuel injection device in a diesel engine wherein a fuel injection quantity fed to the engine is controlled by spilling a part of fuel fed from a high pressure chamber of a fuel injection pump using a high pressure electromagnetic valve, said valve being on-off controlled in accordance with the engine operating conditions, comprising:

fuel cut means for cutting said fuel injection quantity fed to the engine;

switch means provided between said high pressure electromagnetic valve and power source:

a driving circuit provided between said high pressure electromagnetic valve and ground, for on-off controlling said electromagnetic valve; and trouble detecting means for monitoring a signal for driving said electromagnetic valve, and opening said switch means to keep said electromagnetic valve in a constantly deenergized condition and drive said fuel cut means to cut the fuel injection quantity fed to the engine when said electromagnetic valve is placed in an enegizing condition by said signal for driving said electromagnetic valve for more than a predetermined period.

2. A fuel injection device in a diesel engine as set forth in claim 1, wherein said trouble detecting means comprises:

a charging and discharging circuit which starts charging for a predetermined time when sid signal for driving said high pressure electromagnetic valve places said valve in said energizing condition, and discharging when said signal places said valve in said deenergizing condition; and a comparing circuit for comparing an output level of said charging and discharging circuit with a predetermined level, and opening said switch means and driving said fuel cut means when said output level of said charging and discharging circuit is higher than said predetermined level.

3. A fuel injection device in a diesel engine as set forth in claim 1, wherein said swich means is a relay of normally open type.

4. A fuel injection device in a diesel engine as set forth in claim 1, wherein said high pressure electromagnetic valve spills a fuel in a pressurized fuel feed chamber of a fuel injection pump to a low pressure side of fuel when said high pressure electromagnetic valve is not energized.

5. A fuel injection device in a diesel engine as set forth in claim 1, wherein disconnection detecting means for detecting a disconnection of a wire between said high pressure electromagnetic valve and said driving circuit is provided, and said trouble detecting means opens said switch means and drives said fuel cut means when said disconnection detecting means detects said disconnection of the wire.

6. A fuel injection device in a diesel engine as set forth in claim 1, wherein said fuel cut means comprises a fuel cut valve for cutting a fuel fed to a pressurized fuel feed chamber of the fuel injection pump, and said fuel cut valve is connected in parallel to said high pressure electromagnetic valve and connected in series to said power source through said switch means.

7. A fuel injection device in a diesel engine as set forth in claim 6, wherin said fuel cut valve cuts the fuel fed to the pressurized fuel feed chamber when said fuel cut valve fuel cut valve is not energized.

8. A fuel injection device in a diesel engine as set forth in claim 1, further comprising means for closing said switch means withal said signal for driving said high pressure electromagnetic valve when a voltage of said power source is low and the engine is in a starting condition.

9. A fuel injection device in a diesel engine as set forth in claim 8, wherein said means for closing said switch means comprises:

a logical AND circuit for outputting an on signal when a starter signal and a signal detecting low voltage of said power source are on; and a transistor for turning off the signal inputted to a charging and discharging circuit of said trouble detecting means, when said logical AND circuit is on.

* * * * *